United States Patent [19]

Krock et al.

[11] 3,731,003

[45] May 1, 1973

[54] NON-DIAL STATION SERVICE FOR PABX TELEPHONE SYSTEM

[75] Inventors: Elmer W. Krock, Chicago; Charles J. Simon, Hinsdale, both of Ill.

[73] Assignee: GTE Automatic Electric Laboratories Incorporated, Northlake, Ill.

[22] Filed: July 22, 1971

[21] Appl. No.: 165,252

[52] U.S. Cl. ............................179/27 FF, 179/18 BF

[51] Int. Cl. ............................................H04m 3/42

[58] Field of Search ......................179/27 FF, 27 BF, 179/18 BF

[56] References Cited

UNITED STATES PATENTS 2,261,243 11/1941 Flint..................................179/27 FF

*Primary Examiner*—William C. Cooper
*Attorney*—K. Mullerheim et al. and Theodore C. Jay, Jr.

[57] ABSTRACT

A private automatic branch telephone system controlled by a central processor to interconnect stations. Included are an attendant cabinet, central office trunks, a paging circuit and attendant's link circuits that are initially operable to connect a central office trunk to an associated attendant cabinet and further operated to access the paging circuit.

3 Claims, 7 Drawing Figures

Patented May 1, 1973 3,731,003

6 Sheets-Sheet 1

INVENTORS
ELMER W. KROCK
CHARLES J. SIMON

BY [signature]
AGENT

CENTRAL PROCESSOR

Patented May 1, 1973 3,731,003

6 Sheets-Sheet 6

MARKER REGISTER

NON-DIAL STATION SERVICE FOR PABX TELEPHONE SYSTEM

BACKGROUND OF THE INVENTION

1. Field of the Invention

This invention relates to telephone communication systems and more particularly to an electronic private automatic branch exchange (PABX) that incorporates automatic routing of non-dial equipped stations to an attendant.

Private automatic branch exchanges traditionally have incorporated all of the switching techniques normally utilized in telephone central offices. Many of this type of private switching system employ the well-known step-by-step or "Strowger" principle, while still others are of the common control type employing crossbar switches or similar devices as the technique for establishing a path between two stations.

The introduction of electronic techniques in circuitry to the telephone communication field to date has found its greatest utilization in the areas of central office switching and signal transmission. Until recently the usage of these techniques in PABX telephone systems has been limited primarily because of cost considerations. Certain recent developments primarily in the areas of common control equipment and particularly memory circuitry have made the design of electronic PABX's more attractive economically. Use of stored program common control and solid state devices permits a considerable reduction in the amount of equipment installed in customer premises.

2. Description of the Prior Art

One form of electronic PABX employing common control, utilizes a stored program to direct all processing and diagnostic routines as well as collecting traffic data for the central office. In such a system the arrangement is to employ two units, a switching unit located on the customer's premises and a control unit in the central office. Exchange of information between the control and switching units is over high speed data links. In such an arrangement one control unit can serve several switching units and a single switch may serve several customers. Calls in this system are handled one at a time under control of the stored program instructions. Obviously such a system is primarily limited to those environments where the customer desired to rent the equipment directly from the operating telephone company associated therewith.

Other electronic systems have employed time division switching, an application of the principle of speech sampling. This permits a number of conversations on the same transmission path, reducing the number of transmission paths on the customer's premises. Such systems traditionally have high initial cost as well as an increasing cost factor relative to size.

A more successful form of electronic PABX has utilized an electronic crosspoint network, but here, too, major considerations have included high power supply cost and high cost for crosspoint. The most successful technique in use at the present time has been the utilization of the sealed reed switch as a crosspoint device. Systems of this sort provide high speed operation with conventional station apparatus and relatively low cost.

SUMMARY OF THE INVENTION

The present invention is drawn to a private automatic branch exchange telephone system that employs stored program control to provide a high degree of flexibility and maintainability. Reliability of components in the circuitry employed permits the usage of unduplicated central control.

Implementation of the circuity of the present system ideally makes use of integrated circuitry. However implementation with discrete components is both feasible and practical. The basic switching matrix employs reed switches for busy testing and for pulling and holding of transmission paths on a space divided switching basis under control of the electronically implemented, common control equipment.

The computer or central processor that forms a part of the common control equipment is similar to that employed in the electronic central office switching system manufactured by GTE Automatic Electric Company and designated C-1 EAX.

Additionally simplification of installation and maintenance is achieved through modular construction with the modules and interconnecting wiring and cabling arranged for plug-in connections. Of particular interest in the present system is its inclusion of facilities for automatic routing of common battery (non-dial) lines to an attendant.

In certain types of PABX telephone system installations it may be desirable to equip certain stations for common battery operation only. Generally speaking these stations are not equipped with a dial or other calling device and have access only to the attendant. Common battery stations such as this are frequently found in hotels, motels, airports, etc. In the present PABX telephone system a capability exists for handling this form of service. The originating calls from these stations are routed directly to an attendant's link, with identification that the call originated from a common battery type station. Calls to these stations will be handled by the system the same as a terminating call to any other station within the system. No special equipment is required to provide the common battery type of service, rather the only distinction being that the telephones employed do not contain a calling device. Much of the control equipment however is particularly arranged to provide for this service.

BRIEF DESCRIPTION OF THE DRAWINGS

FIG. 7 is a diagram showing the manner in which FIGS. 1, 2, 3 and 4 are to be combined.

DESCRIPTION OF THE PREFERRED EMBODIMENT

Figure 7:
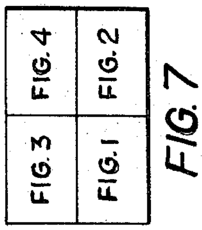

Referring now to FIGS. 1, 2, 3 and 4 arranged as shown in FIG. 7, a preferred embodiment of a PABX telephone system in accordance with the present invention will be described.

Figure 2:
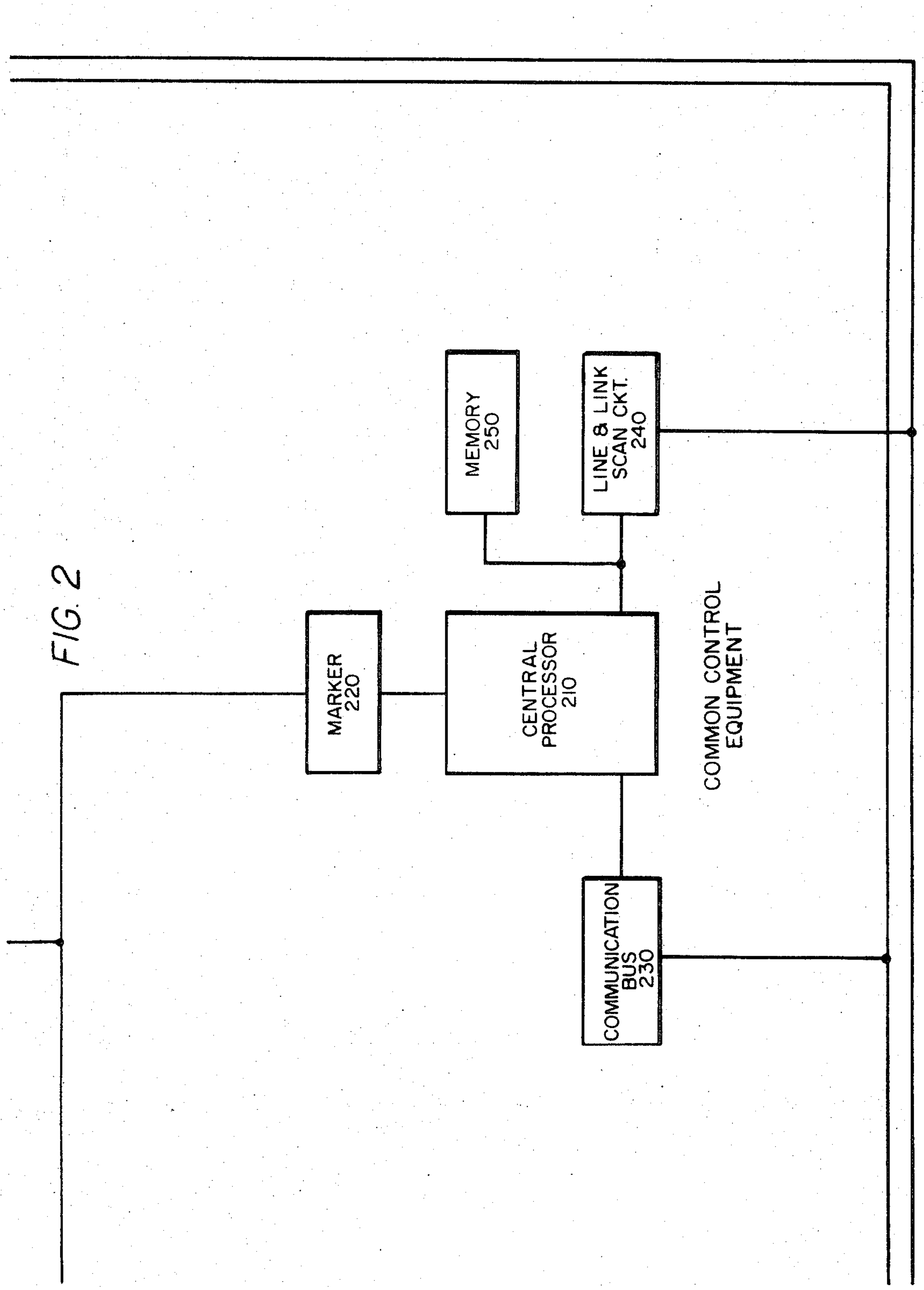

The equipment shown in FIG. 2 is the common or central control for the PABX telephone system and consists of several units. These units are the central processor 210, the marker 220, a communication bus 230, line and link scan circuit 240 and memory 250. These units are normally not furnished in duplicate. However if for any reason duplicate common control equipment is required it may be provided.

The processor 210 may be considered a highly specialized computer. It is the command center or operational heart of the common control equipment. All the other units of the common control equipment perform or operate only under direct command of the central processor 210. As utilized in the present system the processor has a basic order instruction set built into it; which determines its capability and its complexity. For implementation of the proper operation of the PABX as disclosed herein, the basic order instruction set consists of nine instructions. The required circuitry is of conventional design employing high threshold logic along with provisions for processor access to a ferrite core or similar memory. The memory 250 provides the temporary stores necessary to implement the features in the present PABX. Since the instruction set is closely related to the hardware configuration, close examination of each instruction and the internal manipulation of data within the processor is necessary to obtain a detailed understanding of the processor itself.

Figure 5:
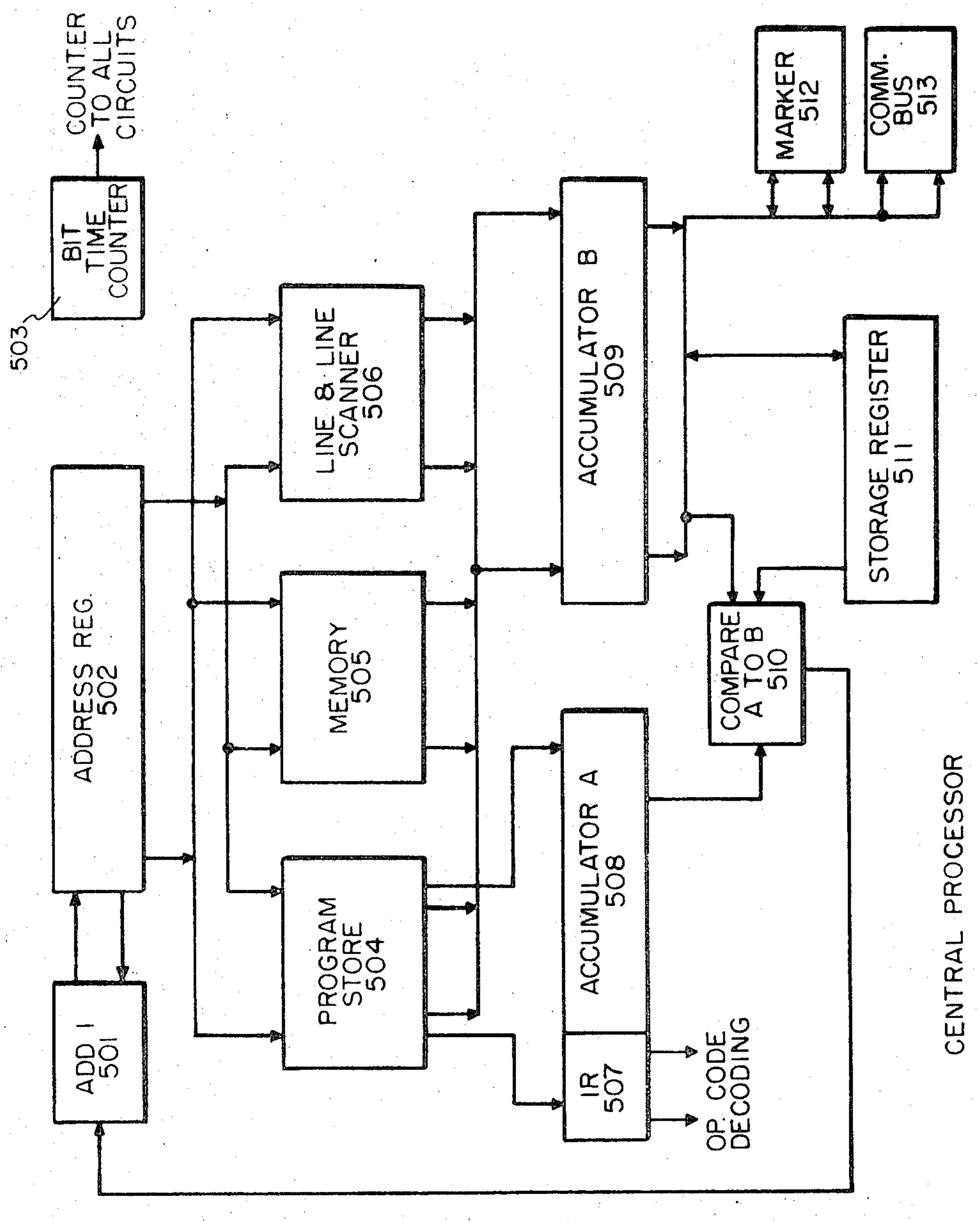
FIG. 5 is a block diagram of a central processor for use in a PABX telephone system in accordance with the present invention.

Referring now to FIG. 5 the information flow through the basic sections of the processor are shown. The heart of the processor is in program store 504, ferrite core memory 505 and the line and link scanner 506 (shown as 240 on FIG. 2). The remaining units respond to information extracted from these memory systems.

The instruction register 507 along with accumulator 508 receive 20 bit instructions from the instruction store portion of program store 504 where decoding of the operation code and temporary storage of the operand take place respectively. Operation code decoding and the output of the bit time counter 503 provide primary control data for information movement within the processor. Once decoding takes place, the information held in accumulator 508 is directed to the memory input portion of one of the three memory systems 504, 505 or 506 referred to previously, or information from accumulator 508 may be used to take action upon information held in accumulator 509. Accumulator 509 provides the facility for data manipulation within the system. It is capable of receiving information directly from the memory systems and directs information to the marker 512, the communication bus 513 or storage register 511, after the operand has been decoded within accumulator 508. "Add one" unit 501 is a functional unit used for advancing the address of the present instruction held within the address register 502 to the address of the next instruction to be acted upon. Another functional unit is the comparator circuit 510 which is utilized in performing the conditional branch instructions.

The rate at which internal functions of the central processor are executed is determined by the frequency used within the bit time counter 503. In the present embodiment this rate is one megahertz. This frequency was established by considering the propagation times encountered for completing internal functions when implemented in high threshold transistor logic, and by considering the cycle times of the memory systems. Each bit time count therefore exists for one microsecond. The maximum count generated within the counter 503 will vary with the type of instruction being executed.

As noted previously, nine basic instructions (or OP codes) are included within the instruction set of the central processor. These are as follows:

Instruction 1

Read (OP code 1)

Read the contents of an address taken from a memory or register and place in accumulator 509.

Instruction 2

Write (OP code 2)

Write the contents of accumulator 509 into a register or ferrite core location whose address is "A." (Where "A" = some storage location in memory, or some register.)

Instruction 3

Transfer (OP code 3)

Transfer the contents of that address in accumulator 509, into accumulator 509.

Instruction 4

Compare (OP code 4)

Compare the 20-bit contents of accumulator 509 with the contents of "A." If equal take the next address in the program. If unequal skip one address in the program.

Instruction 5

Add (OP code 5)

Add 1, 10, or 100 to the contents of accumulator 509 and place the results in accumulator 509.

Instruction 6

Jump (OP code 6)

Jump to instruction "A."

Instruction 7

Mask (OP code 7)

Mask the 20-bit contents of accumulator 509 with the contents of address "A". Do not change the bits of accumulator 509 where "1's" appear in "A". However, reset bits in accumulator 509 to zero where "0's" appear in accumulator 508.

Instruction 8

Superimpose (OP code 8)

Superimpose on accumulator 509 the contents of "A". "1's" in "A" appear in accumulator 509 as "1's". "0's" in "A" cause no change in accumulator 509. Superimpose equipment is supplied for all 20 bits.

Instruction 9

Scan (OP code 9)

Scan by advancing by 1, beginning with the address in accumulator 509. When accumulator 508 compares with the number in the processor's storage register, the search for the number is complete, advance to the next address in the program. Stop address is placed in storage register 511B. When accumulator 509 and "A" storage of store 511 compare, advance the address register to the next address.

Returning now to FIG. 2, the memory 250 must handle two types of information. The first of these is the system program, a relative permanent type of data not subject to change unless there are changes in the system features or configuration. The other is temporary information which is undergoing constant change and is utilized for call processing and implementing the features of the PABX system. Storage of both types of information is provided in the present system by means of a ferrite core memory. To insure the validity of information in event of a power failure a memory retention feature is included. The ferrite core memory employed in the present system provides the system with a read-write memory having a cycle time of 3 microseconds. In the present system a memory having a capacity for at least 8,000 20-bit words is employed. This is similar to commercially available units.

Figure 1:
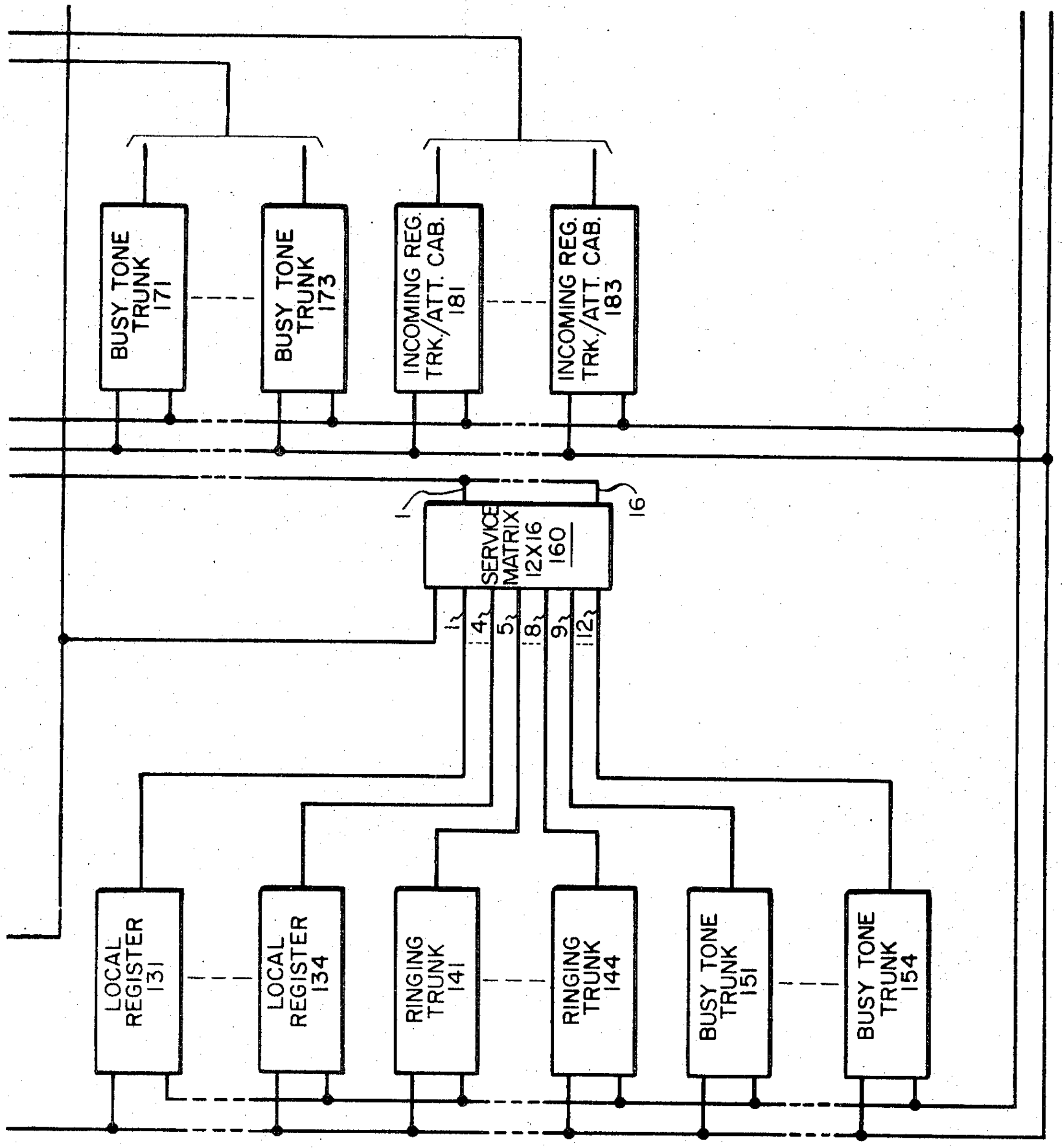
FIGS. 1, 2, 3 and 4 in combination comprise a block diagram of an electronic PABX telephone system in accordance with the present invention.
Figure 3:
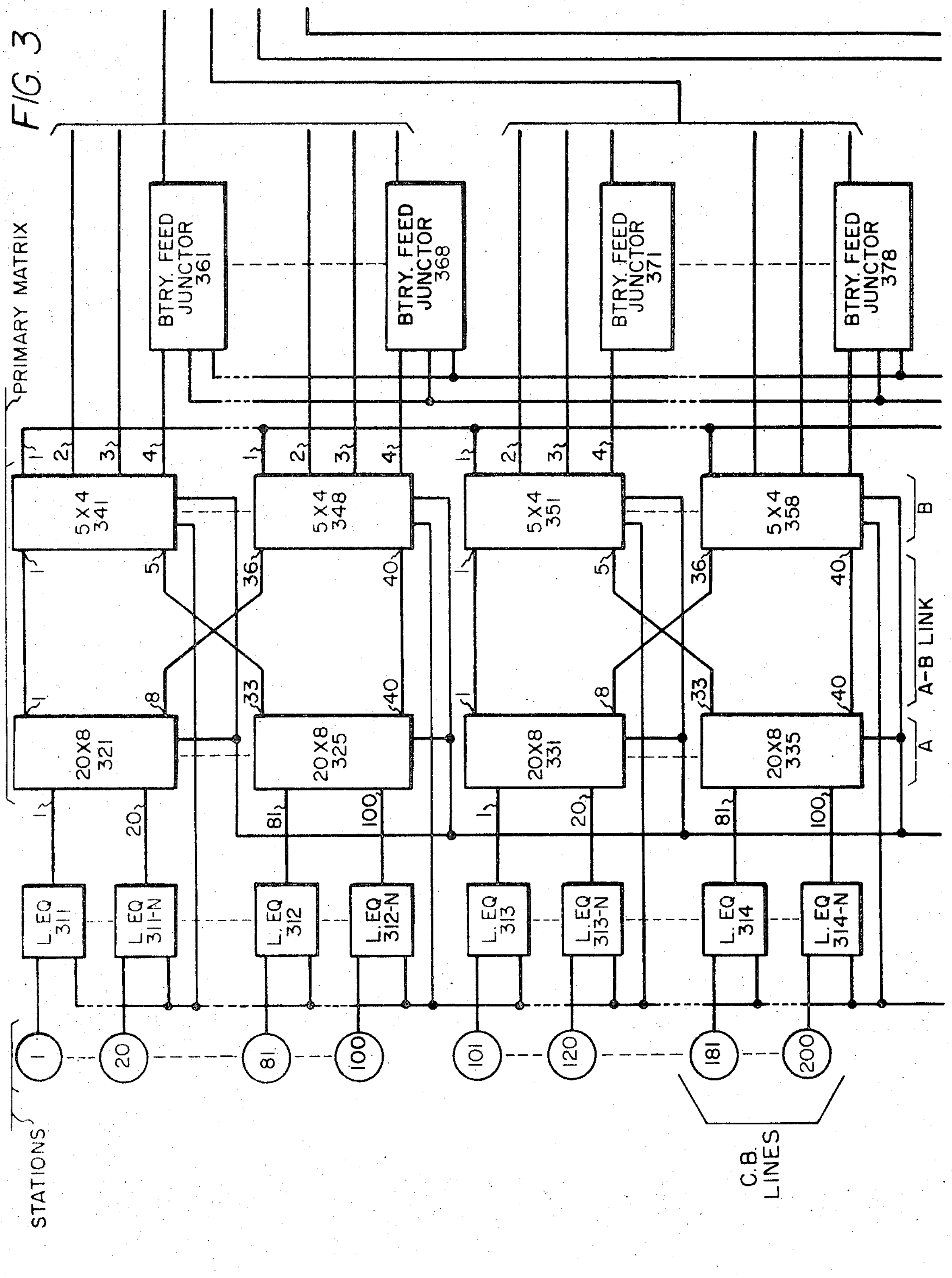
Figure 4:
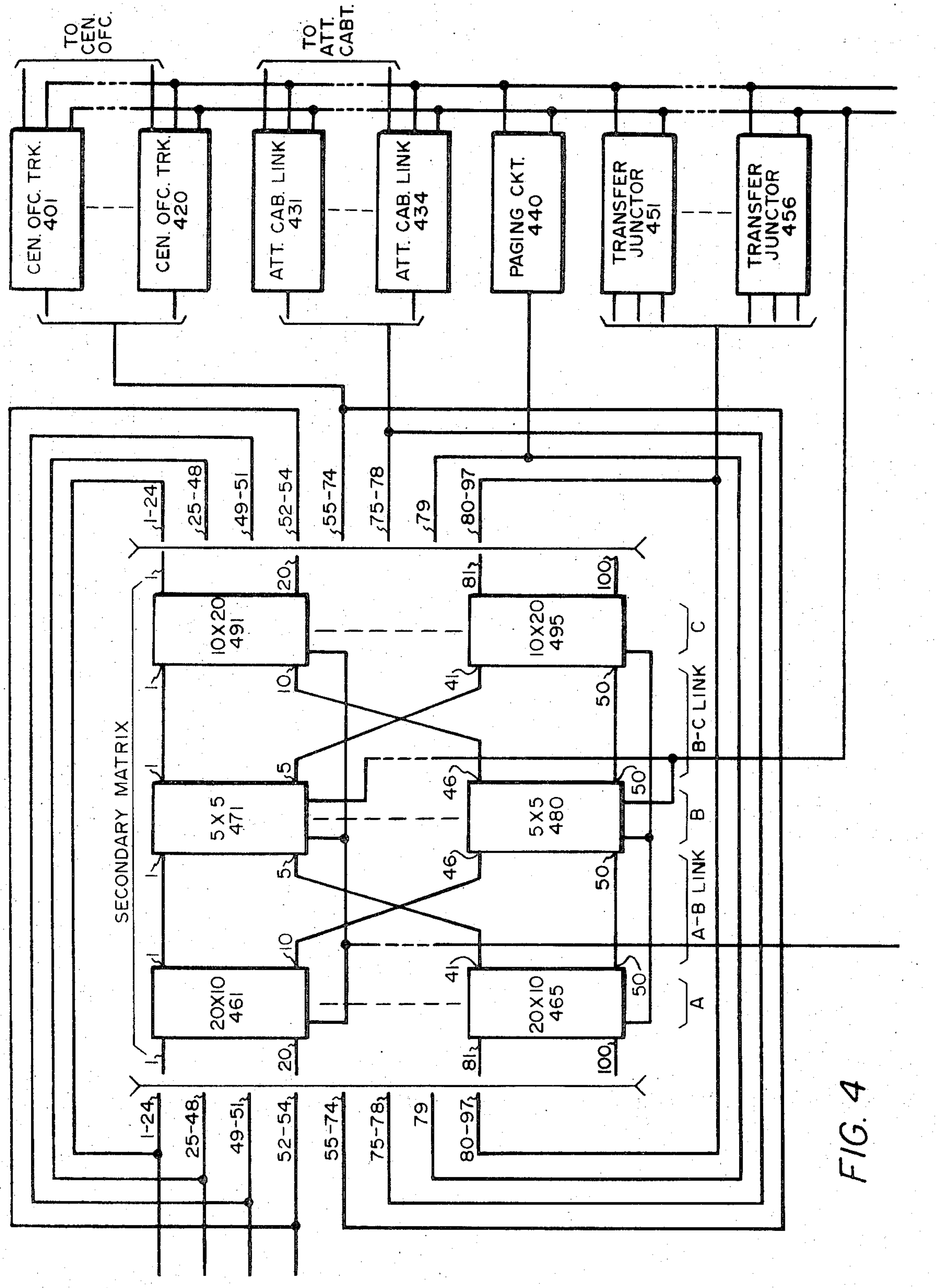

The marker 220 shown in FIG. 2 as a portion of the common control equipment, acts as an interface between the high speed electronic central processor and the relatively slow speed matrices of FIGS. 1, 3 and 4. It is composed primarily of electronic circuitry. By accepting instructions from central processor 210, decoding such instructions and applying necessary potentials, it establishes paths through the matrices. It is in essence an arm of the central processor without the capability of acting, except under instructions from the processor.

Figure 6:
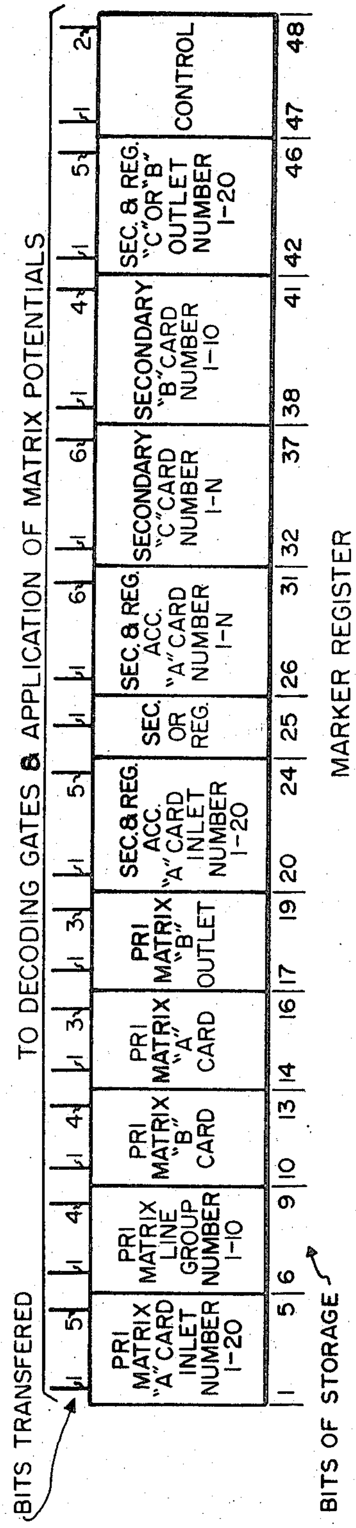
FIG. 6 is a diagram of the arrangement of storage bits in the marker register employed in the present PABX telephone system.

The basic job of the marker is that of controlling the three different matrix stages, the primary matrix shown in FIG. 3, the secondary matrix shown in FIG. 4 and the service matrix shown in FIG. 1. Paths are established across different combinations of the stages depending upon the type and state of the call. The marker is functionally divided into two major segments as may be seen by reference to FIG. 6. These are a first section consisting of bits 1 through 19 and a second portion consisting of bits 20 through 46. These two major segments of the marker enable the establishment of paths across two matrix stages simultaneously. Simultaneous paths can be established across a primary and a secondary stage; and also across a primary and a service matrix stage. Single stage paths can be established across all three individual stages. The heart of the marker is an electronic storage register, shown in FIG. 6, composed primarily of latch circuitry which retain the identities of the elements of the path to be pulled or operated. Information contained within the marker register exists in a BCD code form, and is converted into decimal form by decoding gates whose output through relay drivers operate the connect relays and apply operating potentials to the matrices.

The marker control hardware provides a means by which the central processor triggers the marker in its matrix pulling operation and also provides a means by which the marker can notify the processor that the pulling operation has been completed. This control hardware is noted as a two latch circuit storage segment of the marker register, and a timing circuit used in timing the matrix pulling operation. The first latch circuit will provide control to all decoding gates, inhibiting their output until the processor sets the latch. The second latch stores the output of the timing circuit which provides a call for service flag to the processor. Upon recognition of such flag or marking, the central processor will reset the latch and proceed to check the busy idle status of the matrix elements used in establishing a path. It may be seen by reference to FIG. 6 that the marker segment serving the secondary matrix also serves the service matrix stage.

The secondary matrix of FIG. 4, being a three stage network, is pulled in a slightly different manner than the primary matrix. As in the case of the two stage array, potentials are applied via a bus to one end of the A matrix cards and one outlet of the C matrix cards. The connect relay or relays are associated with the B stage matrix crosspoints. The contacts of the connect relays expose both the A-B and B-C links for pulling potential application. Since the matrix array expands with increasing traffic and since more links may exist than there are contacts available on one connect relay, the connect function may require multipling two or more relays. A particular connect relay is pulled by the decoded B matrix card identity. Application of potentials to the A-B and B-C links result in A card and C card identities respectively. The two segments share pulling potentials for bus leads associated with the inlets of the A cards, A-B links and B stage outlets with the B-C links.

The technique employed in controlling the matrices in pulling and holding operations is the conventional approach normally utilized in reed relay types of matrices. The holding of the matrix is a function of loop continuity in operation of battery feed relays. Because primary and secondary matrix stages can be pulled simultaneously two stages may be held without the aid of a junctor circuit interlaced between the stages. As will be discussed later, during a typical call sequence the choice of a battery feed junctor, like 361, may be made so that the junctor is associated with either the originating or the terminating primary stage. This option allows the junctor to apply a holding ground to a path consisting of either two or five stages. If the processor had analyzed the busy/idle status of the path and found all battery feed junctors associated with the originating primary stage were busy, a battery feed junctor associated with the terminating primary stage would have been chosen. The resulting path would then find five crosspoints being held on the originating side and two on the terminating side.

The line and link sensing circuit 240 shown as a portion of the common control equipment in FIG. 2 consists of an arrangement of drive amplifiers and linear ferrite cores arranged to determine the status of the various lines, trunks and links of the PABX telephone system. In the arrangement of the present system contacts of the line and cutoff relays for each line such as equipment 311 of FIG. 3 are interrogated by line and link circuit 240 for their busy or idle states. In addition to line scanning, peripheral equipment status conditions are scanned in a similar manner.

As noted previously the present PABX telephone system incorporates three matrices, a primary matrix as shown in FIG. 3, a secondary matrix as shown in FIG. 4 and a service matrix as shown in FIG. 1. In a practical embodiment of the present system these matrices consist of reed type relays. These particular units offer speed of operation and adaptability to a variety of matrix configurations.

A basic line group matrix arrangement as shown in the primary matrix is a two stage array. As may be noted by reference to FIG. 3 the system as shown provides for 100 inlets per group on the primary matrix. Additional groups may be handled in 100 line increments.

The secondary matrix of FIG. 4 is a three stage folded array arranged to grow in 100 inlet increments. Based upon the system as disclosed herein having a capacity of 200 lines, 100 inlets are provided.

The line or primary matrix as noted is divided into 100 line increments. Each increment has an A stage and a B stage. The A stage being a 20 × 8 matrix such as 321 and a B stage being a 5 × 4 array such as 341. There are five such A arrays per hundred lines and eight of such B arrays for each hundred lines with the subscribers being connected to the 20 inputs of each array and the B stage being attached to the 8 or outlet side of the A stage. The B stage consists of eight 5 × 4 arrays with each inlet on an array being attached to a different A array. Three of the four outlets of the B stage are run to the secondary matrix via a direct connection or by way of a battery feed junctor. The fourth outlet of each array is connected to the service matrix 160 of FIG. 1. The service matrix contains facilities for connections to registers, ringing trunks, busy tone trunks and other miscellaneous units.

The secondary matrix of FIG. 4 consists of a three-stage folded array which can serve various sized offices by varying the number of A and C modules and increasing the size of the B modules. The A and C modules are 20 × 10 or 10 × 20 arrays with the 20 side connected to the trunks and junctors or to the primary matrix as may be seen in the case of arrays 461 and 491 with the 10 side of each array connected to the various B arrays. Each trunk junctor or primary matrix outlet is connected to a like numbered termination on both the A and C stages.

There are inlets on the A and C stages for each outlet of the line section to the secondary section and for each trunk and for each attendant link and for each service circuit which must be terminated on this matrix. There are 10 B arrays in the secondary matrix and each array connects to one of the 10 outlets from each A and C stage as may be seen by arrays 471 through 480 shown in FIG. 4.

The dimensions of the B arrays are determined by the number of A and C arrays, that is if there are five A and C arrays as shown in the present system 100 inlets to the secondary section, each B array is 5 × 5. If for example there were 20 A and C arrays resulting in 400 inlets to the secondary section each B array would be 20 × 20. Thus the dimensions of the B arrays may vary.

The service matrix 160 of FIG. 1 is a simple one-stage array used to connect the subscriber to a register or other service circuit such as busy tone trunks or ringing trunks.

In addition to the common control equipment of FIG. 2 and the primary, secondary and service matrices discussed previously a variety of peripheral equipment such as line circuits, registers, battery feed junctors, trunk circuits, transfer junctors, etc. are also included in the present PABX telephone system. These peripheral units accept supervisory signals from lines and trunks that inform the common control equipment that some action is required. The common control equipment then determines the establishment of all connections through the matrices of the system. The peripheral units themselves, however, control the holding or releasing of most connections independently of the central processor 210. The peripheral units also perform such other tasks as providing transmission battery, ringing and busy tones, accepting dialed digits, trunk signaling, interface, etc. Typically speaking the circuitry of such said peripheral units are relay operated.

Included in the peripheral circuits are the following:

Line circuits, such as 311 through 314-N are relay units consisting of a line and a cutoff relay. The status of these two relays (operated or non-operated) is detected by the central processor through the line and link scan circuit 240 and indicates the condition of the line, that is whether it is busy, idle or calling for service. A line circuit is provided for each line to be served.

Local registers 131 through 134 and the incoming registers from trunk or attendant cabinet 181 through 183 are closely associated with the common control equipment. Their primary function is to accept dialed information from stations or distant offices and interface with the common control equipment for analyzation of the dialed information. The processor under program control analyzes the digits as received and stores them in a segment of the memory associated with each register. Class of service marks are also stored in this memory.

Each register holds the path through the matrix back to the line or trunk during reception of digits. Timing is also incorporated in each register. This prevents it being held an excessive length of time if a subscriber should fail to dial or to complete dialing within a predetermined interval. If this happens the register will signal the processor which will route the call to a busy tone trunk and allow the register to release.

After sufficient digits have been received to route the call and the common control is unable to find an idle path through the matrix to the desired destination, the central processor 210 may instruct the register to return a 120 IPM busy tone to the originating subscriber for approximately 10 seconds. If the originating station fails to disconnect during this interval, the processor will route the call to a busy tone trunk and allow the register to release. If TCMF or 2/6 MF reception is required MF receivers will be incorporated within the registers as required.

Battery feed junctors such as 361 through 378 shown in FIG. 3 are utilized in the present telephone system only on local to local calls. These units will be thought of as performing the same basic function as a connector circuit in a step-by-step system. In the present system battery feed junctors are provided on a 100 group basis and one port of each junctor has an appearance on the primary or line group matrix. The second port is located on the secondary matrix. The junctor may be used for serving, originating or terminating local to local calls in the particular line group to which it is assigned. This dual use is accomplished by an additional relay per junctor which allows it to reverse. Using the junctor in this manner offers more efficient usage and reduces the total number required for given grade of service.

A battery feed junctor provides holding potentials for the matrix paths. It also provides ringing for the called party and ringback tones to the calling party, as well as transmission battery to both called and calling parties. The quantity required is determined by the amount of local to local traffic within the offices.

The PABX telephone system in accordance with the present invention may incorporate trunk circuits such as 401 through 420 to a public central office, or alternately similarly trunks to other PABX systems. The types of trunks required will be dependent on the service desired and the type of signaling employed. All of such trunks are arranged to provide transmission battery to the PABX subscribers on both incoming and outgoing calls and will also provide holding potential for the matrix. The trunk circuits are arranged to return ringback tone on incoming calls because the ringing of their called station will be accomplished from ringing trunks to provide a distinctive ring. Where trunks to public central offices are involved, circuit arrangements allowing for interconnecting the system to telephone company facilities via an interconnecting trunk can be incorporated. When transfer service is required, the trunk circuits might be equipped with a flash trap feature as a means of recognizing the desired transfer.

Also incorporated in this system are transfer junctors such as 451 through 456 inclusive. With direct in-dialing to PABX's, the transferring of trunk calls by stations without an attendant's assistance is a highly desirable feature. This service is achieved through the utilization of transfer junctors. Transfer junctors in the PABX are multi-port devices providing tie points between the trunk circuits and the transferring from and the transferred to stations.

To effect a transfer the subscriber will normally flash his hook switch which will be detected by the trunk circuit. The trunk then requests service from the central processor 210 which will recognize the fact that the subscriber is requesting a transfer service. The processor will determine that there is a transfer junctor available by means of the line and link scanning circuit 240 then will establish connections between the PABX subscriber and the transfer junctor, the trunk and the transfer junctor and the transfer junctor and a register. The processor will then instruct the trunk to release the former connection between the trunk and PABX subscriber. The PABX subscriber will now receive dial tone from the register and may now dial the station he wishes to transfer to. The "transferred to" subscriber will be rung from the ringing trunk and ringback tone will be returned to the "transferring" subscriber from the transfer junctor. By answer of the "transferred to" subscriber, a connection will be made connecting him into the transfer junctor. When either the "transferred to" or "transferring" party disconnects, the processor will be signaled by the transfer junctor. The processor then establishes a direct connection between the remaining subscriber and the trunk and will instruct the transfer junctor to release. This procedure may be repeated as often as transfer is desired.

The transfer junctor supplies holding potentials for the matrix paths while it is in use and will also provide the transmission bridges for the subscriber connected to it.

Other peripheral circuitry including such things as paging circuits may also be included in the present PABX system.

The remaining unit of the common control equipment of FIG. 2 is the communication bus 230. The transfer of information from the processor to the peripheral circuit such as trunks, junctors, operator link circuits, etc. is accomplished via the communication bus. As in the case of the marker the communication bus not only provides the media by which information is transferred but also buffers the high speed electronic operation of the central processor with its low power levels and high speed operation from the electromechanical operation of the peripheral circuits with their relatively slow speed and high power levels.

The communication bus is similar in nature to the marker in its implementation. The heart of the communication bus is an electronic storage circuit comprised primarily of latch circuits. A 20-bit register is functionally divided into two sections with bits 1 to 10 providing storage for the identity of the peripheral unit to which instructions or data is to be passed. This section is further divided into two functional segments; bits 1 to 5 provide the group number while bits 6 to 10 provide the element of the group number to which the peripheral unit belongs. Bits 11 through 18 form the second major section of the storage register. This section stores the instruction or data to be passed to the peripheral unit. Bits 19 to 20 serve the bus as control bits providing a means of triggering the actual transfer and also providing a means by which the data bus can notify the processor that transfer is complete. A timing circuit within the communication bus is triggered by the processor command to transfer and at the completion of the timing interval notifies the processor that the transfer information is complete.

As in the case of the marker, decoding gates change the binary contents of the peripheral identity section of the storage register into a decimal form. Thirty-two decimal codes are provided to each of the two identity coordinates giving the communication bus the capability of transferring information to a maximum of 1,024 peripheral units. Testing the validity of the communication bus during call processing is accomplished by utilizing a similar approach as applied in checking the marker's validity. The communication bus is permanently connected to the read amplifiers via storage read circuits enabling the processor to check the actual information potentials being transferred to the peripheral units.

Referring now to FIG. 1 there is shown ringing trunks 141 through 144 inclusive. These units provide busy idle indications to the central processor 210 by means of relay contacts connected to the line and link scanning circuit 240. They also provide matrix holding facilities by closing ground to the C lead of the matrix. Ringing and ring trip facilities with an indication provided to the processor when the trip condition occurs, are provided. The ringing trunk circuits do not provide ringback tone as this is incorporated in the incoming trunk circuits. Variable timing indications to the processor via the line and link scanning circuit is provided on unanswered calls.

Also included in the PABX telephone system are busy tone trunks such as 151 through 154 and 171 through 173 which provide facilities for providing busy idle indications to the processor as well as matrix holding and releasing facilities. In the busy tone trunk circuits busy tone is returned through the holding bridge existing across the trip and ring of an established telephone connection to monitor disconnects. Upon disconnect the holding ground is opened and the trunk is released.

As shown the present PABX telephone system incorporates the basic feature of dial intercommunication. That is to say each of the stations that are included in the telephone system may communicate with other stations as long as each calling station is dial equipped (or equipped with a TCMF unit) and no particular restrictions are placed on the receiving of calls by the called stations.

Trunk circuits from a central office or other PABX to the present PABX are arranged so that all incoming calls are extended to an attendant's link. The trunk circuit on recognizing an incoming call, calls for service from the processor and causes a connection to be established across the matrix to an attendant's link. The attendant is then signaled and upon answering will have a capability of extending the call by use of her key set. The attendant may stay with the call or retire from the call after keying the desired number. In either case supervision is maintained to the link until the called party answers.

Again unless special restrictions are placed upon stations of the PABX, direct outward dialing is permitted from all stations. By dialing a particular code number an outgoing trunk may be accessed and a second dial tone will be returned from the central office or distant PABX. After the code number is dialed the register of the PABX is released and the PABX subscribers connected directly to the trunk. Succeeding digits are then keyed or dialed through the trunk into the central office or distant PABX equipment. A description of these operations and how they operationally include the previously described component sections of the present PABX telephone system will be presented in the following. In this manner an understanding of the operational relationship of the system elements can be obtained by simple description of several typical calls. For this purpose reference is made to FIGS. 1, 2, 3 and 4 taken in combination.

Initially a subscriber such as that at station 1 wishing to place a call lifts his handset seizing the line relay associated with his line and incorporated in associated line equipment such as 311. When operated the line relay contacts prepare a call for service indication within the line's cores of the line link's scanning circuit 240. This call for service request is recognized by the central processor 210 as it executes its line scan subroutine. The identity of the calling line is generated by first interrogating groups of 100 lines and then the lines within the group. Extracted from the cores of the line and link scan circuit 240 along with the status bits are the class of service information bits necessary in processing the call. A bit in the class of service word identifies the type of register which must be attached to the line requesting service. The attachment of the register such as 131 to a line is accomplished by completing a connection to cross the primary matrix group which includes matrices 321 through 358 on which the line is connected and then across the service matrix. The actual pulling and holding operation is accomplished by the marker circuit 220 in a single operation.

The central processor 210 splits the task of finding an idle path from a line to a register into three distinct tasks. The first task is preselecting an idle register of the proper type. The second task is selecting an idle primary to service matrix link. The third task is that of testing the associated AB link of the primary matrix that includes matrices 461 through 495 inclusive as shown in FIG. 4.

When the complete path from the calling line to the register has been determined by the central processor, operation of the marker 220 for the pulling of the path will be started. A local register such as 131 will cause this path to be held and return dial tone to the calling subscriber. The register will accept the dialed digits and the processor will shift a digit at a time from the register to the memory storage area associated with the particular register. The central processor and associated memory 250 analyze the digits to determine the routing of the call.

The connection of the subscriber to a register is described as follows:

The detailed subscriber to register path is the product of a logical sequence of data handling steps. Again for a clear understanding it is necessary to consider the routines in the manner that they occur. First an idle register must be selected. This selection is accomplished by entering one of two tables provided for the purpose. One table supplies register addresses of the dial pulse type while the other provides addresses of the touch calling multifrequency type. The starting address of the list is generated from a list of constants and the status indication is read. The first status addressed is incremented by one each time a busy condition is detected. When an idle register is located an analysis of the busy idle status of the primary matrix to service matrix links is started. If all the local registers such as 131 through 134 are found to be busy, the processor branches away to other work routines returning later to complete the line to register connection. Analysis of the primary matrix to service matrix begins by manipulating the identity format of the line calling for service. From the identity of the line calling for service an idle outlet is selected on the proper line group primary matrix card which connects to a service matrix inlet. This selection begins by using the line group number of the calling line to develop the outlet status test address needed. By masking the line group number the A matrix number and the A matrix inlet number with a constant and then merging with another constant, the line group number, the B card matrix number and the B card outlet number are obtained. The result of this routine provides the address of the first B card and the first outlet. This first outlet of every primary matrix B card provides access to the service matrix. The busy idle status of this outlet is established by reading at the address developed. If the outlet test indicates that the link to the service matrix is idle, the associated A to B link of the primary matrix is tested. If the outlet test indicates that the link is busy a new link is tested by incrementing the first tested address by ten. This operation increments the B card number by one, resulting in the next link being tested. The previous sequences of testing continues until the last link is tested. Detecting the last link as busy causes the processor to branch to another work routine. After completing this work routine the processor returns for another attempt at locating a path connecting the subscriber and the local register.

When the primary matrix B card outlet is tested idle, the associated AB link is tested by reading at an address developed from the outlet test address. The B card outlet number of the outlet test address is replaced by the A card number of the calling line identity. If the A-B link tests busy, a new B matrix outlet must be chosen. If the A-B link tests idle a path has been defined from the line to the service matrix inlet.

After the A-B link has been tested, the C-D link completing the entire path must be tested for its busy idle condition. The address of the C-D link status word is generated from the inlet location of the C matrix card of the service matrix. Presently the identity of the B-C link is only defined in terms of its outlet appearance on the B matrix card. Since the B-C links are cross connected in the pattern defined by the office, a table look up operation is used to identify the C matrix inlet identity. Each entry within the table contains both the B card outlet and the C card inlet identities. A table search is then made by the central processor by comparing the B card outlet identities listed with the outlet identity being used in the matrix path.

From the C card inlet identity, the C-D link test address is generated in the same manner as the A-B link test address previously described. If the C-D link is idle when tested the entire path has been defined. If the C-D link is busy when tested a new B-C link must be chosen and the corresponding A-B and C-D links tested.

The details of the path chosen are stored in memory 250 at the location dedicated for marker use. As the elements of the path are defined they are stored in the core until the entire path has been defined and then they are transferred to the marker registers. Having chosen a register, an instruction is sent to the register pulling a busy relay and preparing it for the forthcoming matrix pulling and holding operations.

At the appropriate time, central processor 210 begins the pulling of the matrix crosspoints by transferring the details of the selected path to the marker 220 and instructions indicating the crosspoints are to be pulled or operated. As the crosspoints of the matrix are being pulled, a slow to operate relay in the register is operated. The operate time of this release is chosen so the matrix crosspoints never switch with potentials on them. On the closure of this cut-through the holding potentials for the matrix are applied from the register circuit. A timing circuit associated with the marker control circuit signals the central processor 210 after sufficient time has elapsed for the entire marker operation. Recognition of this signal by the processor enables a checking operation of the defined connection to be started. The elements of the connection are tested to insure that they have become busy. In the event that the path is not busy, maintenance routines are entered which will assist in determining the malfunction.

Stored in the memory dedicated to the registers is the line equipment number of the calling line and the B matrix card number of the primary matrix used for register connection. These details must be retained for further reference by the central processor 210 in establishing the connection from the subscriber to his desired destination.

Having been connected to a register and having received dial tone, the subscriber then begins dialing. The technique employed in the present telephone system for dialed digit registration utilizes a pulsing relay driving a segment within the ferrite core memory 250 via an electronic buffer circuit. This segment of the memory is used in conjunction with the stored program as a dial pulse counter. The buffer circuit existing between the pulsing relay and the core store is composed of a timing circuit used for eliminating short hits on the line. When a pulse is recognized by the pulsing relay and the timer has validated the condition as a true pulse, the condition is stored by setting a latch circuit associated with the register. The true condition of the latch serves as a call-for-service signal to the central processor 210. When recognition of the signal takes place, the latch is reset by the processor after advancing the dial pulse counter. The interval between register scans must be sufficiently short, so that information is not lost due to the second pulse arriving before the first is accumulated. In the event that the processor is unable to recognize the call-for-service signal and reset the latch before a second pulse is received, a second latch is set. When the processor does return to the register and finds the second latch set the subscriber is connected to busy tone to prevent misrouting of the call.

Timing of the interdigital pause is accomplished by a function in the relay circuitry of the register. The pause condition is stored on a latch circuit and is recognized by the processor as it scans the registers. Once recognition takes place the latch is reset. The interdigital pause condition causes the digits accumulated in the dial pulse counter to be shifted to the digit store area. An interdigital pause condition stored on a latch as well as a pulse condition stored on a latch can be encountered on any given scan by the processor. This situation results from a pulse of the next digit being recorded during the time that an interdigital flag is set and still not recognized. The processor handles the situation by moving the contents of the dial pulse counter to the digit store and then storing the count of 1 in the pulse counter. Timing of disconnect is handled by the "B" relay function included rather than by an electronic timing element. Permanent timing is accomplished by an electronic timer which is part of the register hardware. Commands to the relay equipment for busy tone, dial tone, or hold conditions are stored on latch circuits in the register. These commands are triggered by the central processor at the appropriate time.

After sufficient digits have been received and analyzed to determine that the call is to terminate locally, central processor 210 in conjunction with the line and link scanning circuit 240 will determine the busy-idle status of the desired station. If the desired or called station is idle, the central processor 210 through the line and link scanning circuit 240 will select an idle, direct connection between the primary and secondary stages of the matrix and an idle battery feed junctor such as 361 in the proper line group for the originating and terminating subscribers. If an idle direct connection between a primary and secondary stage and battery feed junctor are found in the proper line groups, the central processor will approve an idle path from both originating and terminating subscribers to the direct connection between primary and secondary matrices and battery feed junctor across the primary matrices of the line groups. The central processor 210 will search for an idle path across the secondary matrix between the direct connection and the battery feed junctor with the help of the line link scanning circuit 240. When the processor has determined that an idle path does exist between the calling and called subscriber via the direct connection and a battery feed junctor, the information for the pulling of the path is passed to the marker 220. As this path is pulled the register previously associated with this call is instructed by the processor to release. The processor 210 and marker 220 are now free to handle other calls.

Ring current is sent to the called subscriber and ringback tone is sent to the calling subscriber from the battery feed junctor such as 361. On answer by the called party, battery feed is supplied to both calling and called subscribers from the battery feed junctor which is also causing the connection to be maintained. Upon completion of the call the battery feed junctor will cause ground to be removed from the hold lead which will allow the entire connection to be released.

The three matrix connections necessary for local-to-local calls require two marker operations. As in the subscriber-to-register connection, the entire matrix path will be chosen before entering a natural marker operation. These marker operations will be sequential in nature and can be completed without dedicating the marker to another task. The central processor 210 in choosing a path across the matrices starts its analysis by first choosing an idle battery feed junctor located on an outlet of the terminating primary matrix stage. If an idle junctor is located, the A-B link connecting the terminating subscriber and the battery feed junctor is then tested. After an idle battery feed junctor has been located, the direct connections between the primary and secondary are tested on the originating primary matrix B card used in the subscriber's register connection. If they are found to be busy, the remaining direct connections are tested in the primary matrix stage. On finding an idle direct connection and an associated idle A-B link, the secondary matrix analysis is ready to begin.

If in the preceding analyses all battery feed junctors are found to be busy in the terminating primary matrix stage, then the battery feed junctors are tested within the originating primary matrix stage. The junctors appearing on the same B matrix card used in the subscriber's register connection should be tested first and then the remaining junctors tested. If an idle junctor is located then a search is made for an idle direct connection in the terminating stage. If all junctors are found to be busy or if all corresponding direct connections are found to be busy, then busy tone is returned to the subscriber from the register to which he is connected.

In the preceding matrix analysis, a path across the originating primary matrix is established by finding a direct connection or battery feed junctor showing the line group of the originating line and preferably appearing on the same B matrix card used for the subscriber to register connection. This B matrix card identity along with the originating line group is stored in the core memory of a dedicated register address. Finding an idle junctor in this B matrix card enables a common connection to be made between the subscriber to register and subscriber-to-subscriber connection. This results in a common A-B matrix link for both connections. The double connection is eliminated when the register is released after the subscriber-to-subscriber connection has been established.

It should be noted that the distribution of direct connections and battery feed junctors on the outlets of the B matrix card follows a regular order. The first outlet provides a direct connection to the service matrix. The second and third outlets provide direct connection while the fourth outlet provides access to a battery feed junctor.

The testing of battery feed junctors such as 361 tied to a terminating primary matrix is accomplished by entering a table which is subdivided into segments corresponding to the number of primary matrix sections installed. The entries within the segment corresponding to the line group of the terminating line are scanned and tested for a busy-idle condition.

When attempting to locate a battery feed junctor associated with the originating primary matrix B stage card the address of the junctor is developed from the B card identity stored in the register memory in the knowledge that the fourth outlet is used for this purpose. All other battery feed junctors are tested in the same manner as used in the terminating primary matrix stage.

When an idle direct connection between the primary and secondary stages is desired, the same techniques are used as those applied in finding an idle battery feed junctor. Construction of the addresses of direct connections between the primary and secondary stages, are needed to develop a common A-B link. It is also done in a similar manner except that the second and third outlets are used.

It should be noted that although an algorithm approach to address development could be employed, a table look up is still needed to define the secondary inlet identity. With this technique, the inlet identity is stored along with the primary matrix B outlet identity. The simplicity of the table look up approach provides ease in programming. Only after two primary matrix paths have been defined, can the processor enter a subroutine for finding a path across the secondary matrix. Since the equipment numbers of the chosen junctor and the direct connection between the primary and secondary stages, establish the inlet and outlet of the connection made across the matrix, the central processor 210 has only to find an idle A-B link and B-C link connecting these points.

Central processor 210 begins the search for an idle secondary A-B link by interrogating the A-B links forming the outlet of the A matrix card on which the direct connection between the primary and secondary stages is located. If after all the A-B links defined have been searched and found to be busy, the outlets of the A matrix card having the battery feed junctor are then searched. When the processor finds an idle A-B link, only one B-C link exists which can complete the desired connection. Testing the B-C link and finding it idle completes the central processor's path analysis. Finding it busy requires the analysis to continue until the twenty possible combinations have been exhausted. Busy tone of 120 impulses per minute is then returned to the calling subscriber. Having the idle path defined allows the processor to start the marker 220 making the defined connections.

Once the link testing is completed and the path defined, the central processor triggers the marker allowing the pulling operation to be completed. A slow-to-operate relay in the battery feed junctor insures that the matrix crosspoint switches before battery potential is applied. Closure of the path allows ringing then to be extended to the terminating party from the battery feed junctor. The connection is held from the battery feed junctor thoughout the conversation.

After completing the matrix maintenance checks on the matrix elements, the central processor 210 releases the register such as 131, associated with this call. This is accomplished by sending the register a release command. After the command has been sent, the local to local processing tasks are complete.

For the handling of a local line to a central office trunk or some other special service, the party at the local station dials a 9, 8 or other special service code causing the central processor 210 to enter routines for connecting the line to a trunk circuit such as central office trunk 401 or perhaps a special service such as paging circuit 440. The mode of processing for trunk calls may employ one of two techniques dependent on the features included within the PABX telephone system. The first technique is used whenever abbreviated dialing capabilities or toll restrictions are not required. This technique allows the first digit to be accepted by the register and then switches the line to the trunk allowing the line to dial directly to the associated central office.

The subscriber receives a second dial tone from the central office prior to his dialing directly into that office. When either restriction or speed calling is required senders must be installed and the appropriate processing routines included.

In conventional dialing the processor recognizes the call as being a local to trunk call after the first digit has been dialed and positioned in the register storage such as local register 131. An immediate search of the proper table defined by the value of the access code is begun. The search is sequential in nature and continues until an idle trunk is found or all trunks within the table are found to be busy. Testing of a trunk is accomplished by reading the location in memory defined by the contents of the trunk table. By reading at this location the busy idle status bits of the line and link scanning circuit 240 for the trunk circuit are analyzed by the central processor 210. If all trunks are found to be busy, then busy tone is returned from the register to the subscriber. If an idle trunk is found, a sub-routine is entered for determining an idle path from the line to the trunk. The details of the path analysis routine are similar to those for a local to local call. Once the local to trunk connection has been completed the register is released and the processor proceeds with its other tasks.

If a local subscriber desires to place a call to the attendant associated with the PABX telephone system, the call is processed in a manner similar to the local to local call previously described until the register begins to accept the dialed digits. Since the subscriber dials only one digit, for example a zero, central processor 210 upon digit analysis begins to extend this call to an attendant cabinet link circuit such as 431. The path extends through the originating primary line group matrix stage and the secondary matrix stage to the attendant's link circuit. The technique employed in traversing the primary matrix is the same as for a local to local call except that the outlet of the primary matrix has a direct connection between the primary and secondary stages. The option of either a direct connection or a battery feed junctor as is the case with a local to local call, is not permitted. The technique for extending the path through the secondary matrix is the same as described earlier except that the inlet and outlet are not defined. Only the inlet is defined by the direct connection between the primary and secondary selection, while the outlet is selected from a list of outlets giving access to the attendant cabinet link circuits. The manner in which the link circuits are examined is important.

By picking the attendant cabinet links in a sequential manner from the last chosen link, a relatively even distribution can be achieved. This desired even distribution is accomplished by choosing the link circuit from a list stored in the memory 250. The address of the first link to be tested is stored in the memory. This address is changed each time a call is completed to an attendant cabinet link. If the first link tested is busy, then the starting address is incremented by 1 and the new link is then tested. This cycle is continued until an idle link is found or all links tested are busy. If all links are busy, busy tone may be returned to the line.

After defining the idle links equipment number the matrix analysis along with the pulling and holding operation follows the technique described for a local to local call. Completion of the connection to the attendant's link causes a lamp on the associated attendant's turret or attendant cabinet to flash at 120 IPM indicating an incoming call.

Incoming calls from a central office or other telephone system are handled in the following manner. An incoming trunk which has been seized by a distant office, requests the central processor 210 to provide service by operation of a relay whose contacts are monitored by the line and link scanning circuit 240. A call for service request is recognized by the central processor 210 as it executes its inlet scan sub-routine at periodic intervals.

Recognition of a trunk request for service causes the processor to examine the class of service for the incoming trunk. If the class marking indicates that the trunk is not of the direct inward dialing type, the trunk is then connected directly to the attendant. If direct inward dialing capabilities do exist for the trunk then the trunk is routed to a register such as 181. As may be observed these incoming registers are located on the inlets of the secondary matrix that are tested for their busy idle status in a manner similar to outgoing trunk circuits in a local to trunk call. This testing is accomplished by sequentially reading and testing the status of entries of a register list of the proper types located in the memory. If all registers are found to be busy the processor returns to other work routines returning at periodic intervals to the register scan for an idle register. Once an idle register is found the processor begins the analysis of the secondary matrix for a path connecting the incoming trunk and the selected register. The pulling and holding of the selected path is accomplished by techniques similar to those described in connection with the placement of a local to local call.

With the connection completed, the register is prepared to receive the incoming information. The information is translated and if the call is to terminate locally, the memory is addressed with the dialed digits resulting in the equipment number of the line. The line is then tested for its busy idle condition. If busy, 60 IPM busy tone is returned from the register to the trunk. If idle the primary and secondary matrices are analyzed for an idle path as described in the discussion of a local to local call. The chosen path is then pulled and held as previously described. A relay within the trunk circuit holds the transmission pair open until ring trip occurs.

Ringing of the called line is accomplished from a ringing trunk circuit such as 141 located on an outlet of a service matrix 160. The connection from the ringing trunk is chosen so that a doubled connection from the trunk to line path is developed in the B matrix of the primary section. The central processor 210 in choosing the B matrix card for the trunk to local connection assures that the outlet of the B card connected to the service matrix stage is idle as well as the link connecting to the secondary stage. An idle ringing trunk such as 141 is found in a similar manner as a local register along with a path connecting it to the B matrix card. When the path is established ringing is applied to the line and the trunk is instructed to give ringback tone to the originating office.

Ring trip facilities are provided within the ringing trunks. These trunks are scanned periodically by the central processor for a tripped condition. Associated with each ringing trunk is a segment of memory capable of storing the identity of the trunk associated with this call. Upon detection of a ring trip condition the cut through relay in the trunk circuit whose identity is being held in memory associated with the ringing trunk is instructed to operate completing the connection between the subscribers. The ringing trunk is then released. It should be noted that segments of the memory storage are associated with each incoming trunk circuit. This storage includes the identity of the ringing trunk circuit providing the ringing to the line associated with the trunk. When the calling line disconnects, during ringing, detection of the condition takes place in the incoming trunk circuit. The central processor recognizes the condition by scanning at periodic intervals the trunk circuits whose identities are stored in the segments of memory associated with the ringing trunks. The ringing trunk having a disconnect signal is then released.

Calls placed by the attendant to local lines are handled in the same manner as incoming trunk calls. The attendant links form a list in memory which is considered by the processor as another trunk group.

In motel or hotel installations groups of common battery stations like those shown in FIG. 3 are often used to answer a summons made over a paging system. In a hotel or motel PABX installation incoming calls are usually terminated at the attendant, who tries to extend the call to the desired party. If the desired party is not in his room or at the PABX station where he is normally expected to be, the attendant may then employ a paging system to summon the desired party. The wanted party on hearing the page may use one of the common battery stations such as 181 through 200 shown in FIG. 3 to answer the page. These telephone substations are conventional in nature except they of course do not include any dial or touch calling facilities. The wanted party on removing the handset from the hookswitch of the common battery station will then identify himself to the attendant. At this time the attendant should have the facility to connect the incoming trunk on which the call originated to the common battery station used for answering the page, without requesting the guest to go "on-hook."

This feature is implemented by the following procedure within the PABX telephone system: An incoming call is extended to the attendant in the normal manner and after attempting to reach the described terminating subscriber at his room, she attempts to summon him via the paging system. The attendant accesses the paging circuit (first placing the incoming trunk circuit in a "hold" state), via the link circuit. Then dialing the proper code to reach the paging circuit 440 via the same attendant link circuit that is "holding" the incoming trunk circuit, the processor 210 recognizing the code, establishes a connection between the link and the paging circuit allowing the attendant to make her announcement. The connection between the link and paging circuit is maintained. As part of normal code paging, the originating subscriber's identity is stored in a segment of memory 250 assigned to the paging circuit. In this case, the attendant's link identity is stored in this memory. When the PABX subscriber answers the page from a regular dial equipped telephone, the processor merely extracts the identity of the subscriber connected to the paging unit and establishes a connection between them. As part of the normal work routine for connecting the two subscribers the answering subscriber is evaluated to determine whether an attendant is answering. After the connection between the two subscribers is established the connection to the paging circuit is dropped.

When the answering subscriber attempts to answer the page from a common battery line, such as 200, the processor 210 after recognizing the call for service, analyzes the common battery line's class of service and routes the answering subscriber to an attendant. When more than one attendant position is employed in the installation, the subscriber might reach a different attendant, other then the one holding the desired incoming trunk circuit. This second attendant, after establishing the fact that a page is being answered from a common battery line, dials the answer code for the paging circuit 440. The processor 210, as part of the code call answer routing, establishes that an attendant is answering an attendant page. Recognition of this fact causes the processor 210 to connect the common battery line 200 connected to one attendant with the incoming trunk circuit connected to the other attendant. The identities of both the common battery line and the incoming trunk circuit were stored in the respective attendant's link segment of memory 250. After completing the final connection all other connections are released. In this manner the attendant may extend the incoming trunk call to the common battery station while it remains in the off-hook condition. This feature is particularly important in cordless type attendant cabinets such as are generally utilized in PABX telephone systems, and like that disclosed herein and particularly of that type utilizing multi-position attendant's cabinets where the page may be initiated by one operator, and the common battery station response is handled by another operator.

While but a single embodiment of the present invention has been disclosed, obvious modifications and variations could be made, without departing from the spirit and scope of the present invention.

We claim:

1. A communication system comprising: a plurality of telephone stations; a central processor; a switching network selectively controlled by said central processor to interconnect said telephone stations; at least one attendant's position; a plurality of attendant's links connecting said attendant's position to said switching network; at least one trunk circuit connected between a telephone central office and said attendant's position; a paging circuit operable to page an individual; a first one of said attendant's links operated to answer an incoming call by establishing a circuit connection between said trunk circuit and said attendant cabinet, and said first link further operated to access said paging circuit whereby a desired individual may be paged.

2. A communication system as claimed in claim 1 wherein at least one of said plurality of stations is equipped with a calling device; said station selectively operated; said central processor operated in response to said selective operation of said calling device equipped station to control said switching network to complete a circuit path through said switching network from said calling device equipped station to said trunk circuit, and to further control said switching network to disconnect said first link from said trunk circuit and said paging circuit.

3. A communication system as claimed in claim 1 wherein said plurality of stations include at least one station non-equipped with a calling device; said central processor operated in response to initiation of a call at said non-calling device equipped station to control said switching network to complete a circuit path through said switching network from said station to a second one of said attendant's links; said attendant's position further including a calling device selectively operated in conjunction with said second attendant's link; said central processor operated in response to said selective operation of said calling device included in said attendant's position to control said switching network to complete a circuit path through said switching network from said non-calling device equipped station to said trunk circuit, and further control said switching network to disconnect said first attendant's link from said trunk circuit, said second link from said non-calling device equipped station and said paging circuit from said attendant's position.

* * * * *